Figure 1:
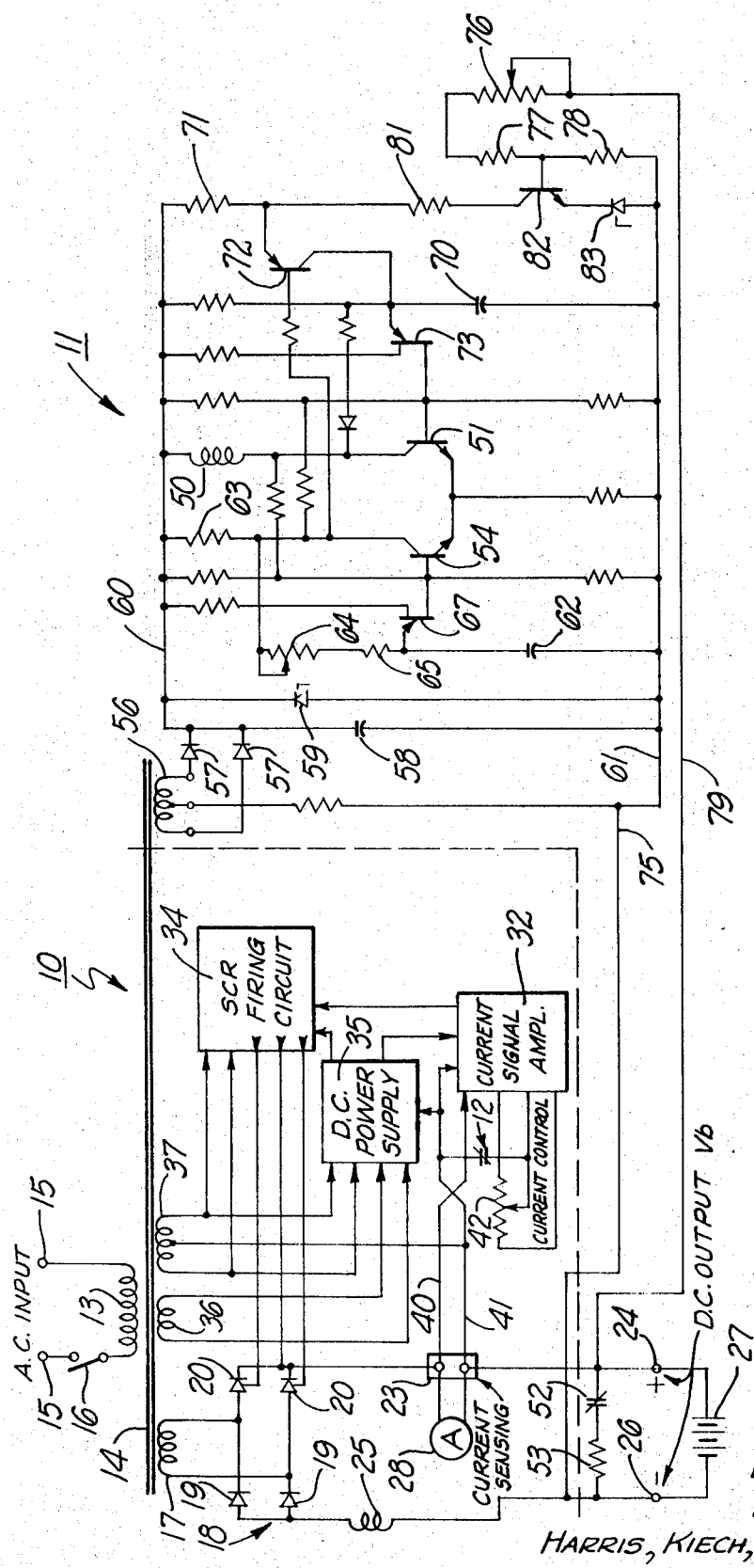

United States Patent

[11] 3,617,851

| [72] | Inventors | Glen O. Du Puy;<br>Mark Schindler, both of Los Angeles, Calif. |
|---|---|---|
| [21] | Appl. No. | 861,569 |
| [22] | Filed | Sept. 29, 1969 |
| [45] | Patented | Nov. 2, 1971 |
| [73] | Assignee | Christie Electric Corp.<br>Los Angeles, Calif. |

[54] BATTERY CHARGER WITH CONTROL CIRCUIT FOR CYCLICAL CHARGE AND DISCHARGE AS A FUNCTION OF BATTERY VOLTAGE DURING DISCHARGE
13 Claims, 3 Drawing Figs.

| [52] | U.S. Cl................................................ | 320/22, |
|---|---|---|
| | | 320/14, 320/21, 320/39, 330/30 D |
| [51] | Int. Cl........................................................ | H02j 7/10 |
| [50] | Field of Search............................................ | 320/5, 9, |
| | | 11, 14, 20–23, 39–40; 330/30 D |

[56] References Cited
UNITED STATES PATENTS

| 1,126,667 | 1/1915 | Wilson .......................... | 320/14 |
|---|---|---|---|
| 1,362,844 | 12/1920 | Candota ........................ | 320/14 |
| 1,382,622 | 6/1921 | Bryce ............................ | 320/14 |
| 2,503,179 | 4/1950 | Tichenor ....................... | 320/14 |
| 3,363,162 | 1/1968 | Bryce ............................ | 320/DIG. 1 |
| 2,366,505 | 1/1945 | Fletcher ........................ | 320/14 |
| 2,752,550 | 6/1956 | Beer............................... | 320/4 |
| 3,176,210 | 3/1965 | Bethke ..........................320/DIG. 2 UX |
| 3,296,516 | 1/1967 | Paine et al. ...................320/DIG. 2 UX |
| 3,445,744 | 5/1969 | Henderson et al............ | 320/40 |
| 3,467,874 | 9/1969 | Richardson et al........... | 330/30 D |
| 3,517,293 | 6/1970 | Burkett et al.................. | 320/14 |

Primary Examiner—J. D. Miller
Assistant Examiner—John M. Gunther
Attorney—Harris, Kiech, Russell & Kern ABSTRACT: A battery charger for charging to full charge in a minimum time while avoiding heating, gassing and loss of electrolyte. A charger which delivers charging current during on or charge periods and which provides a load to the battery during off or discharge periods. A control circuit for controlling the duration of the on and off periods and for varying one of the periods as a function of the battery voltage prevailing during off periods, e.g., by increasing the duration of the off period as the off period battery voltage rises above a given value.

INVENTORS
GLEN O. DUPUY,
MARK SCHINDLER
BY THEIR ATTORNEYS
HARRIS, KIECH, RUSSELL & KERN

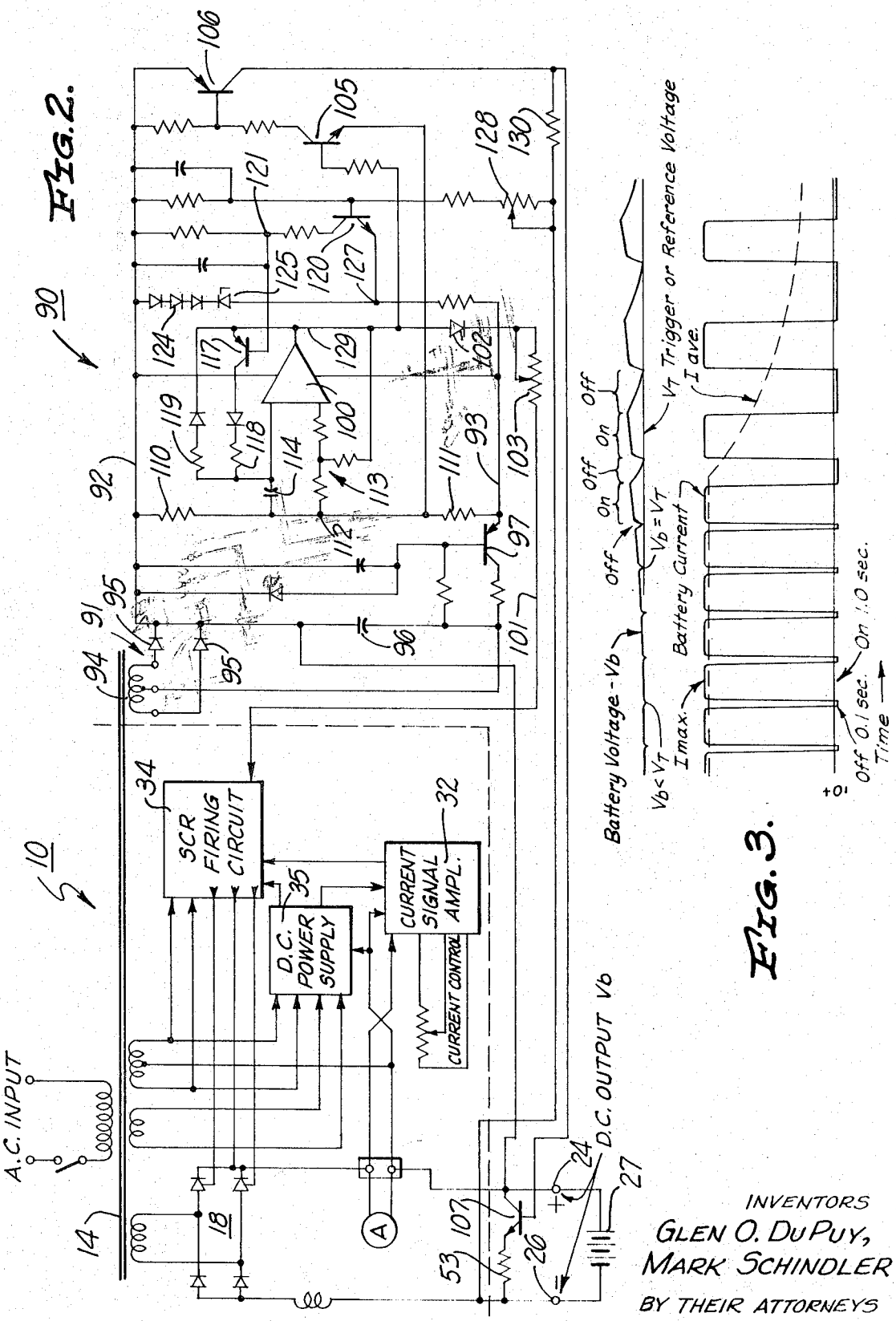

BATTERY CHARGER WITH CONTROL CIRCUIT FOR CYCLICAL CHARGE AND DISCHARGE AS A FUNCTION OF BATTERY VOLTAGE DURING DISCHARGE

This invention relates to battery chargers of the pulse type wherein charging current is delivered to the battery in pulses, and in particular, to a new and improved battery charger wherein a discharging load is provided for the battery in the intervals between periods of application of the charging current.

It is highly desirable that batteries be charged in such a way that they will absorb and deliver their maximum discharge capacity. It is also important that the charging or recharging of a battery be performed in the shortest possible time without harm to the battery and without undue loss of electrolyte.

The condition of a battery normally is determined by a test cycle of (1) giving the battery a complete charge, (2) discharging the battery to verify its capacity, and (3) recharging the battery. Since the battery must be taken out of service in order to perform the test cycle, it is desirable that this be performed in the shortest possible time. Also, the test should be performed without harm to the battery. A battery can readily be charged to approximately 80 to 90 percent of its fully charged state in a relatively short time, such as 1/2 hour, by applying a charging current in the order of 2C, where C is the ampere hour capacity of the battery. However, in order to complete charging to the desired state, the average charging current must be reduced in order to avoid excessive gassing, heating and loss of electrolyte, as to a value of approximately C/5.

Operating under these conditions, the finishing charge may require as much as 2½ hours. The problem is further complicated by the fact that the high rate of discharge during the discharge portion of the test cycle causes a considerable temperature rise in the battery so that the recharge operation starts with a hot battery.

It has been the practice to perform the finishing charging by applying a relatively constant current of reduced magnitude, or by applying a current in pulses with the on and off periods controlled or with the pulse amplitude controlled. These prior art systems have required a relatively low charging current and hence a relatively long time to complete the charge, if heating, gassing and loss of electrolyte are to be held to acceptable values.

The present invention utilizes the pulsating type charging system and operates with relatively high amplitude current pulses during the on or charging portion of the cycle, and applies a load to the battery during the off or discharge portion of a cycle. The charging system of the present invention also provides for varying the duration of at least one of the off and on periods as the battery approaches the fully charged state. The application of the load during the off period slightly discharges the battery and produces a beneficial depolarizing effect which reduces gassing and heating. This in turn permits delivering a complete finishing charge in considerably shorter time and it has been found that a battery which previously required 2½ hours for finish charging to a given state with a specified maximum temperature can be charged to the same state within the permitted temperature rise in 1/2 hour. By sensing the battery voltage during the off periods (rather than during the on periods) any influence of voltage drop through the internal resistance, as well as influence of battery temperature, is practically eliminated.

The invention is illustrated and described herein as used with conventional pulse-type chargers and other objects, advantages, features and results will more fully appear in the course of the following description. In the drawings:

FIG. 1 is an electrical schematic of a pulse-type battery charger with a control for the on and off cycle incorporating one embodiment of the present invention;

FIG. 2 is a similar schematic illustrating another and presently preferred embodiment of the invention, and FIG. 3 is a plot of battery voltage and current illustrating the operation of the charges of FIGS. 1 and 2. The circuit of FIG. 1 includes a power system 10 and a control circuit 11. The power system 10 may be a conventional regulated battery charger, except for the relay contact set 12, and a number of the conventional components are illustrated in block diagram form.

A primary winding 13 of transformer 14 is connected to AC input terminals 15 via an on-off switch 16. A secondary winding 17 is connected to a fullwave rectifier assembly 18, comprising diodes 19 and controlled rectifiers (SCRs) 20. The positive terminal of the rectifier assembly 18 is connected through a resistor 23 to the positive output terminal 24 of the charger. The negative output of the rectifier assembly is connected through a filtering inductance 25 to the negative output terminal 26 of the charger. The battery to be charged 27 is connected to the output terminals 24, 26. The voltage across the terminals 24, 26 is the battery voltage, sometimes identified as $V_b$. A meter 28 is connected across the resistor 23 to indicate the charging current to the battery.

The power system 10 also includes a current signal amplifier 32, an SCR firing circuit 34, and a power supply 35. A secondary winding 36 provides an AC input to the power supply 35 at one voltage level, and a secondary winding 37 provides a voltage input to the power supply 35 at another voltage level. The power supply 35 provides DC power for the amplifier 32, and firing circuit 34.

The firing circuit 34 provides control signals to the SCRs 20 for switching the SCRs into conduction during succeeding half cycles of the AC power source in response to signals from the amplifier 32.

A signal varying as a function of the magnitude of current delivered by the charger to the battery is provided as an input to the current signal amplifier 32 on conductors 40, 41. The current signal amplifier 32 provides a signal to the firing circuit 34 to vary the conduction time of the SCRs and maintain the charging current at a desired value, which desired value may be adjusted by the current control potentiometer 42.

With the conventional power system described above, charging current is supplied to the battery in pulses at the AC supply frequency, with the SCRs 20 being turned on during each half cycle to maintain a predetermined charging current.

This power system is used in conjunction with the control circuit 11 of the present invention. The control circuit 11 permits the power system 10 to operate in its normal manner to supply pulsating charging current for a period of time referred to as the on or charging period. During the on period, the contact set 12 is open. The control circuit 11 functions to close contact set 12 causing the current signal amplifier 32 to provide a signal to the SCR firing circuit 34 to maintain the SCRs in the nonconducting condition for a second period of time referred to as the off or discharging period. The charging and discharging or on and off periods are cyclically repeated, with one on and one off period comprising a cycle of operation of the control circuit. By way of example, during a typical charging operation, the on period may be initially one second and the off period initially 0.1 second, as shown in the left portion of FIG. 3. As the battery approaches the 90 percent of full charge state the on period may be one second and the off period may be 10 seconds. The transition to longer off periods is shown in the right portion of FIG. 3. When the battery is nearly fully charged, the on period may be one second and the off period may be 60 seconds. During the on periods, the magnitude of the pulsating charging current is maintained substantially constant by the operation of the current signal amplifier of the conventional power system.

During the charging periods the battery voltage $V_b$ rises, and during the discharge period the battery voltage drops, as shown in FIG. 3. Control circuit 11 maintains a constant on period and a constant off period until the battery is 75 percent to 85 percent charged, then the off periods become longer. After the battery voltage $V_b$ exceeds the reference voltage $V_T$, an on period does not start until $V_b$ falls to the value of $V_T$. Control circuit 11 acts as a switch, holding the charger off while the voltage is above the preset voltage point $V_T$ and when the battery voltage decays or drops to the preset point, turns the charger back on.

In the control circuit 11, a coil 50 of a relay is connected in the collector circuit of a transistor 51. The relay includes the contact set 12 and another contact set 52 which connects a load resistor 53 across the charger output terminals 24, 26. The transistor 51 and another transistor 54 are connected in a differential amplifier circuit so that the relay coil 50 is energized when transistor 51 is conducting, and is deenergized when transistor 54 is conducting. The contact sets 12 and 52 are normally closed and are opened when the coil 50 is energized. The coil 50 is energized during the on or charging period of a cycle with the current amplifier 32 in operation and with the load resistance 53 not connected. The coil 50 is unenergized during the off or discharging period, with the current signal amplifier 32 maintaining the SCRs in a nonconducting condition and with the load resistor 53 connected to the battery 27 as a load.

A power supply comprising secondary winding 56, diodes 57, filter capacitor 58 and a zener diode 59 provides a DC voltage at conductors 60, 61, serving as a stable reference voltage for the control circuit.

A capacitor 62 is charged through resistor 63, variable resistor 64, and resistor 65. When the voltage on the capacitor 62 rises to a particular value, as determined by the magnitude of the various components in the circuit, a unijunction transistor 67 is switched into conduction thereby switching the transistor 54 into conduction. Transistor 54 turns on (saturates) by the firing of transistor 67 and reduces the base voltage of transistor 51 through the resistor network and by differential action, thereby turning transistor 51 off and holding it off until it is turned on by the unijunction transistor 73.

A capacitor 70 is charged through resistor 71 and transistor 72. When the voltage on the capacitor 70 increases to a predetermined level, unijunction transistor 73 is switched into conduction which in turn switches transistor 51 into conduction. Transistor 51 switches on (saturates), lowering the base voltage on transistor 54 below its emitter voltage through the collector resistors of transistor 51 and base divider resistors of transistor 54 and by differential action, thereby turning transistor 54 off.

Output terminal 26 is connected to conductor 61 by a conductor 75 and output terminal 24 is connected to a variable resistor 76, a resistor 77 and a resistor 78 by conductor 79. A resistor 81, a transistor 82 and a zener diode 83 are connected between the resistor 71 and the conductor 61, with the base of the transistor 82 connected to the junction of the resistors 77, 78. The transistor 82 is normally in the nonconducting or high impedance condition. When the battery voltage increases above a predetermined level, the transistor 82 begins to conduct, increasing the voltage across resistor 71 causing the transistor 72 to reduce the charging current to capacitor 70 thereby increasing the charging time for capacitor 70 (increasing the duration of the off period).

In the operation of the system, consider the situation when transistor 51 is conducting and relay coil 50 is energized. The system is in the on or charging period with contact sets 12 and 52 open. Capacitor 62 is being charged and the time required to charge this capacitor to the point where transistor 67 turns on determines the duration of the on period. Potentiometer 64 provides for adjustment of this duration. At the end of the on period, transistor 67 and transistor 54 conduct, transistor 51 becomes nonconducting and the relay coil 50 is deenergized, initiating the off or discharge period. With a relatively low battery voltage, the transistor 72 is in the low impedance or saturated condition and the capacitor 70 charges relatively rapidly, until transistors 73 and 51 are turned on, terminating the off period. This cyclical operation continues until the battery voltage rises above a predetermined value, which may be adjusted by the potentiometer 76. At this time, the transistor 82 begins to conduct and thereby increases the duration of the off period, with the off period becoming longer and longer as the battery voltage increases.

In a typical charging system, the on period may be set for 1 second and the off period with transistor 82 nonconducting may be set for 1/10 th second. The potentiometer 76 is set so that transistor 82 will start conducting when the battery is in the range of about 75 to 85 percent of full charge, preferable at about 80 percent of full charge. As the battery approaches full charge the off period becomes longer and may increase to about 60 seconds at full charge.

The current control potentiometer 42 for the current signal amplifier 32 may set to maintain the charging current in the range of about 1.6 to 2.5 C, preferably at about 2 C. The magnitude of the load resistor 53 may be selected so that the battery discharge current through the resistor is in the range of about C/8 to C/12, preferably at about C/10.

Varying of the duration of the off period as a function of the off period battery voltage after such voltage reaches a preset value provides a tapering down of the average charging current thereby permitting completion of the charge without heating or damage to the battery and permitting continuation of charger operation after full charge has been achieved.

The duration of the off period, which can be visually observed at the current meter 28, provides an indication of the state of charge. During the early portion of the charging operation, the off periods are quite short and are hardly noticeable. After the transistor 82 starts to conduct, the increase in duration of the off periods can be readily noted at the meter 28. The initiation of the longer off periods can be used as a signal to manually set a shut-off timer switch or can be used to automatically initiate a shut-off timer operation if desired.

The charging system provides for charging at a relatively high current during the charging period and for discharging the battery with a relatively low current during the off period. The system also provides for increasing the duration of the off period with respect to the on period, while providing a high charging current during the on periods.

While the embodiment disclosed provides for increasing the duration of the off period, it should be noted that the control circuit could be used to decrease the duration of the on period and achieve the desired result. The load may remain connected to the battery during on periods, with a reduction in efficiency of operation, but it is preferred to switch the load out when the charging current is switched on.

The control of the on and off periods may be obtained by various other timing circuits and variations in the duration of the periods may be automatically programmed if desired. One alternative embodiment for the control circuit is illustrated in FIG. 2, with a power system corresponding to the power system 10 of FIG. 1 and with a control circuit 90 producing the same control function as the control circuit 11 but with different circuitry.

The control circuit 90 includes a regulated power supply 91 providing a stable DC voltage at conductors 92, 93. The regulated supply 91 includes a secondary winding 94, diode rectifiers 95, a filter capacitor 96, and a transistor 97 connected in a conventional regulating circuit.

The control circuit further includes an amplifier 100, here an integrated circuit is connected as an operational amplifier to provide a signal on line 101 via diode 102 and potentiometer 103, to the firing circuit 34 to maintain the SCRs in the off or nonconducting condition during the off or discharging period of the operating cycle. The amplifier 100 also controls transistors 105 and 106 which in turn control transistor 107 which operates as a switch to connect the load resistor 53 across the terminals 24, 26 and to disconnect the load resistor from the terminals 24, 26. Resistors 110, 111 are connected as a voltage divider to provide a reference voltage at point 112 for the inputs to the amplifier 100. Resistor network 113 provides one input to the amplifier. Capacitor 114 provides a second input to the amplifier.

The capacitor 114 is charged through transistor 117 and resistor 118, with the charging time for the capacitor providing the control of the off period. The capacitor 114 is discharged through resistor 119 providing a control for the on period.

The amplifier 100 functions to connect line 129 to the positive voltage line 92 during the off period. This positive voltage on line 129 gives a signal through diode 102, resistor 103 and line 101 to the firing circuit 34 to hold it off. Transistor 117 is controlled by the battery voltage $V_b$ through transistor 120. During low $V_b$ the base of 120 is positive with respect to its emitter, and transistor 120 is saturated putting a positive voltage on the base of transistor 117 causing it to saturate, giving a minimum charging time for the capacitor 114 and a minimum duration off period.

When the capacitor 114 charges to a level determined by the bias of resistor network 113, the amplifier 100 disconnects the line 129 from line 92, reducing the positive voltage to the firing circuit 34 allowing the firing circuit to turn the charger on. The charger will remain on while capacitor 114 discharges through resistor 119. When line 129 was disconnected from the positive voltage of line 92, a new and lower bias level was established on amplifier 100 which determines the point that capacitor 114 discharges to before the amplifier 100 switches, signalling the firing circuit 34 of another charging off period.

As the battery voltage $V_b$ rises during the charging, transistor 120 is turned off when the base voltage becomes more negative than the fixed reference voltage of the emitter of transistor 120 (determined at point 127 by diodes 124 and zener diode 125). When transistor 120 reduces conduction or cuts off, point 121 approaches the positive voltage of line 92, causing transistor 117 to increase its impedance increasing the charging time of capacitor 114. The setting of variable resistor 128 establishes the battery voltage where transistor 120 is cut off.

When line 129 is connected to line 92, the voltage of line 129 approaches the positive voltage of line 92. This causes transistor 105 to switch on, switching on transistor 105, which switches on transistor 107, applying the bleeder resistor 53 across the battery terminals during the off period. Resistor 130 applies a bias to transistor 107 to keep it nonconductive during the on period.

As the battery 27 increases in charge, the voltage of the battery rises to a higher and higher value and the "surface charge" increases with charger on. During the on period of the charger after the battery has been charged to the 75 to 85 percent level, the battery voltage rises to a high level due to "surface charge" mainly. By applying a applying during the off period, the surface charge is reduced and when the battery voltage discharges to the preset level as determined by the setting of resistor 128, the charger is turned on again, starting the next on period.

The control circuit 90 to HFIG. 2 provides a control function similar to that of the control circuit 11 of FIG. 1. During the initial part of the charging operation, the duration of the on and off periods remain substantially constant. When the battery reaches about the 80 percent of full charge condition, the duration of the off period increases, as determined by the transistors 120 and 117. 1

2 We 3 claim:

1. In a battery charger providing a DC current to a battery, the improvement comprising in combination:

first switching means for turning the charging current off and on;

an electrical load for the battery;

means for connecting said load to the battery;

a control circuit for said first switching means including, first control means for cyclically operating said switching means to turn the charging current on during an on period and turn the charging current off during an off period at intervals in the order of a second throughout the charging operation, with an on period and an off period comprising a cycle of operation, with no limit on the battery voltage during the on period, and with said load discharging the battery during off periods, means for sensing the voltage of the battery during the off period with said load connected to the battery, and said periods as a function of the sensed battery voltage; and means operative after the battery voltage exceeds a predetermined value for varying the duration of at least one of said periods as a function of the time required for the battery voltage to drop to said predetermined value; and circuit means for connecting the battery to said control circuit.

2. A battery charger as defined in claim 1 in which said control circuit includes means for varying the duration of said off period as a function of the voltage of the battery during an off period.

3. A battery charger as defined in claim 1 wherein the battery charger provides a current in the range of about 1.6 C to 2.5 C, where C is the ampere hour capacity of the battery, and said load is selected such that the current in said load is in the range of about C/8 to C/12.

4. A battery charger as define in claim 1 in which said means for connecting said load to the battery includes second switching means for connecting and disconnecting said load, and in which said first control means cyclically operates said second switching means to disconnect said load during an on period and connect said load during an off period.

5. A battery charger as defined in claim 1 in which said control circuit includes:

a source for reference voltage;

comparison means having said off period sensed battery voltage and said reference voltage as inputs for producing a control signal as an output when said sensed battery voltage exceeds said reference voltage; and means responsive to said control signal for increasing the duration of off periods relative to the duration of on periods.

6. A battery charger as defined in claim 1 in which said control circuit includes:

a source for a reference voltage;

comparison means having said off period sensed battery voltage and said reference voltage as inputs for producing a control signal as an output when said sensed battery voltage exceeds said reference voltage; and means responsive to said control signal for maintaining said switching means in the off condition.

7. A battery charger as defined in claim 1 in which said control circuit includes:

a capacitance;

a first circuit for charging said capacitance, with the charging time controlling the duration of one of said periods;

a second circuit for discharging said capacitance, with the discharge time controlling the duration of the other of said periods; and an amplifier having the voltage on said capacitance as an input, with said amplifier included in said first control means and operating said switching means to connect and disconnect said load and to turn the current off and on as a function of the voltage on said capacitance.

8. A battery charger as defined in claim 7 including circuit means for varying the impedance of one of said first and second circuits as a function of an input voltage at said circuit means, and means for connecting the battery voltage as said input.

9. In a battery charger providing a DC current to a battery, the improvement comprising in combination:

first switching means for turning the charging current off and on;

an electrical load for the battery;

means for connecting said load to the battery;

a control circuit for said first switching means including, first control means for cyclically operating said switching means to turn the charging current on during an on period an turn the charging current off during an off period, with an on period and an off period comprising a cycle of operation, and with said load discharging the battery during off periods, a reference voltage source, X a first capacitance charging circuit for charging from said reference voltage source, with the charging time controlling the duration of one of said periods, and a second capacitance charging circuit for charging from said reference voltage source, with the charging time controlling the duration of the other of said periods, with said first means operating said switching means as said charging circuits reach predetermined voltage levels; and circuit means for connecting the battery to said control circuit.

10. A battery charger as defined in claim 9 including circuit means for varying the impedance of one of said charging circuits as a function of an input voltage at said circuit means, and means for connecting the battery voltage as said input.

11. A battery charger as defined in claim 9 in which said control circuit includes:

a differential amplifier circuit having two halves which are sequentially switched into conduction and having a relay coil as the load in one of said halves, said relay coil comprising a portion of said first control means; and circuit means connecting one of said charging circuits to one half of said amplifier circuit and connecting the other of said charging circuits to the other half of said amplifier circuit in controlling relation.

12. In a battery charger providing a DC current to a battery, the improvement comprising in combination:

first switching means for turning the charging current off and on;

an electrical load for the battery;

means for connecting said load to the battery;

a control circuit for said first switching means including, first control means for cyclically operating said switching means to turn the charging current on during an on period and turn the charging current off during an off period, with an on period and an off period comprising a cycle of operation, and with said load discharging the battery during off periods, an operational amplifier included in said first means, a capacitance providing a voltage as an input to said amplifier, a first circuit for charging said capacitance, with the charging time controlling the duration of said off period, and a second circuit for discharging said capacitance, with the discharge time controlling the duration of said on period, with said amplifier operating said switching means to connect and disconnect said load and to turn the current off and on as a function of the voltage on said capacitance; and circuit means for connecting the battery to said control circuit.

13. In a battery charger providing a DC current to a battery, the improvement comprising in combination:

first switching means for turning the charging current off and on;

an electrical load for the battery;

means for connecting said load to the battery;

a control circuit for said first switching means including, first control means for cyclically operating said switching means to turn the charging current on during an on period and turn the charging current off during an off period, with an on period and an off period comprising a cycle of operation, and with said load discharging the battery during off periods, means for sensing the voltage of the battery during the off period with said load connected to the battery, means for setting the duration of said on and off periods at desired values, and means for increasing the duration of said off period as a function of the voltage of the battery during an off period when the battery voltage exceeds a predetermined value; and circuit means for connecting the battery to said control circuit.

* * * * *

UNITED STATES PATENT OFFICE
CERTIFICATE OF CORRECTION

Patent No. 3,617,851          Dated November 2, 1971

Inventor(s) Glen O. DuPuy and Mark Schindler

It is certified that error appears in the above-identified patent and that said Letters Patent are hereby corrected as shown below:

Reference, patent 3,363,162, "Bryce" should be --Bawden--.

Col. 1, line 74 "The circuit of Fig. 1" should begin a a new paragraph.

Col. 5, line 42 "applying" (second occurrence) should be --bleeder--;
    line 47 "to HFIG.2" should be --of Fig. 2--;
    line 54 "and 117.1" should be --and 117.--;
    line 55 "2 We 3 claim" should be --We claim--;

Claim 1 (lines 72 and 73) "said periods as a function of the sensed battery voltage; and" should be deleted.

Claim 9 (col. 6, line 72) "source, X" should be --source,--.

Col. 7, line 7 "cuit.1" should be --cuit.--.

Signed and sealed this 2nd day of May 1972.

(SEAL)
Attest:

EDWARD M. FLETCHER, JR.
Attesting Officer

ROBERT GOTTSCHALK
Commissioner of Patents